Figure 1:
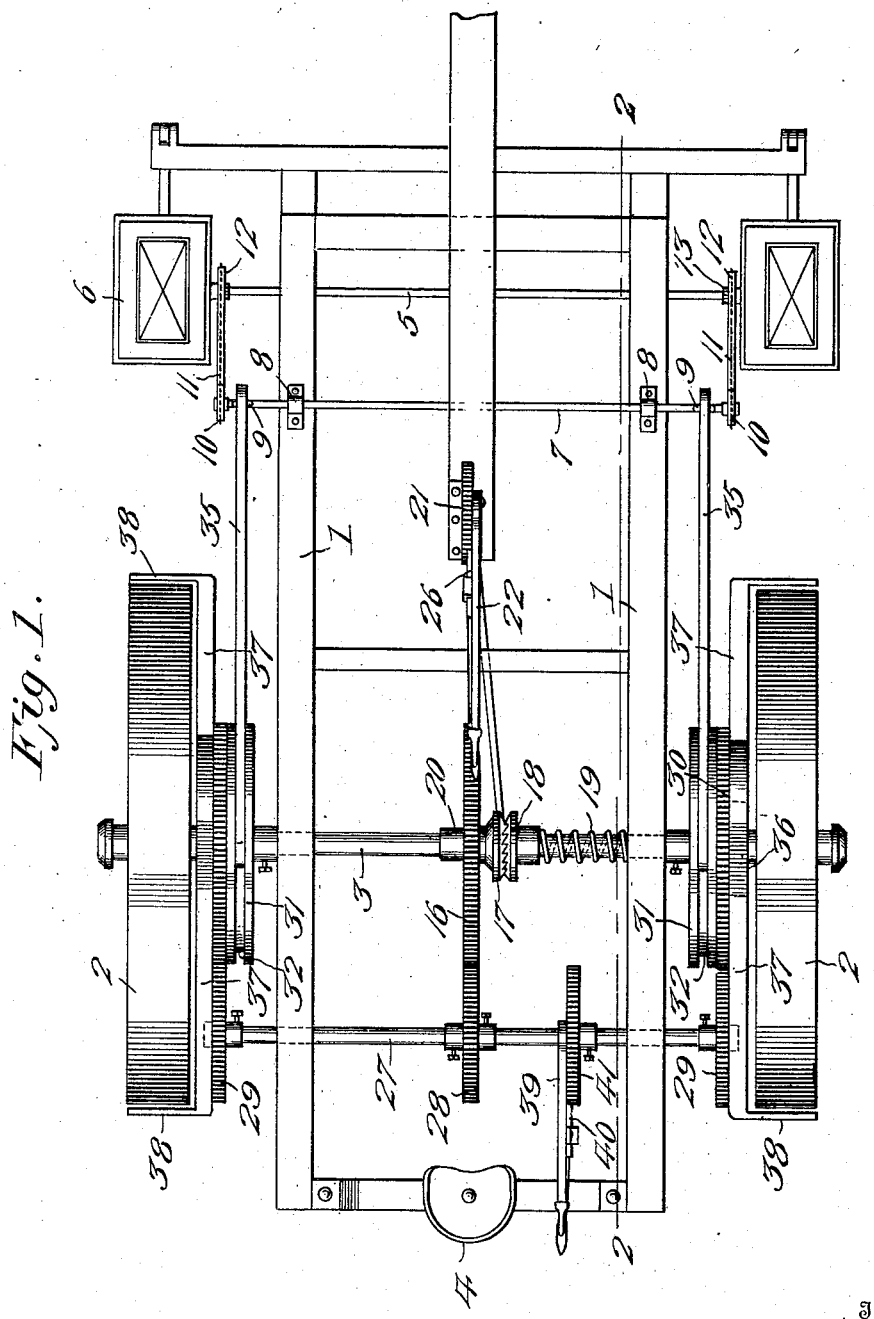

No. 842,755. PATENTED JAN. 29, 1907.
H. F. BLAIR.
CORN PLANTER.
APPLICATION FILED NOV. 3, 1906.

2 SHEETS—SHEET 1.

Witnesses
Frank B. Hoffman
F. S. Elmore

Inventor
Henry F. Blair
By Victor J. Evans
Attorney

No. 842,755. PATENTED JAN. 29, 1907.
H. F. BLAIR.
CORN PLANTER.
APPLICATION FILED NOV. 3, 1906.
2 SHEETS—SHEET 2.
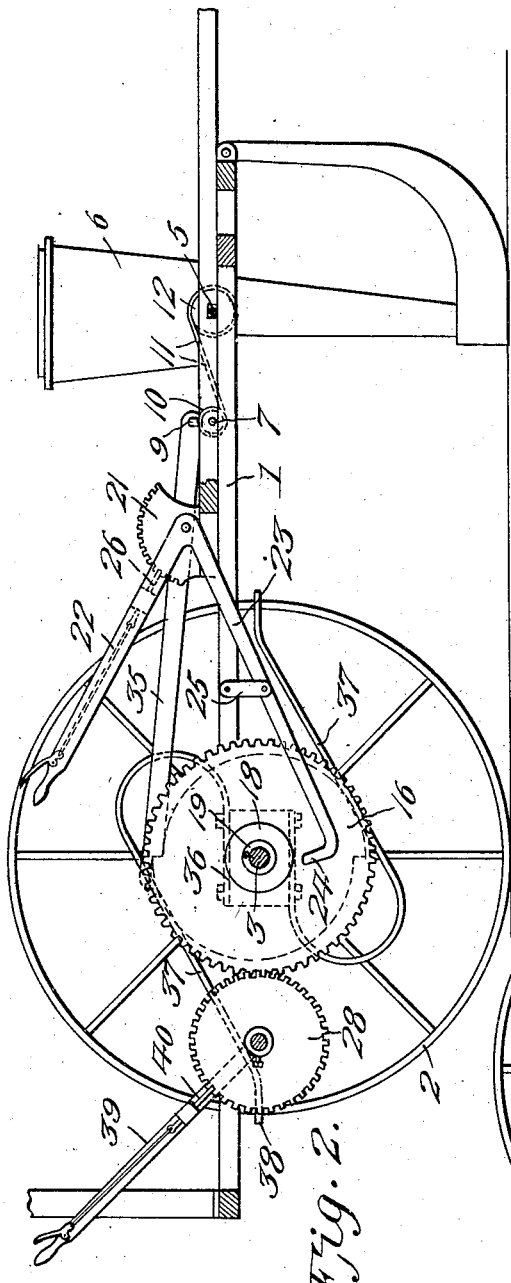
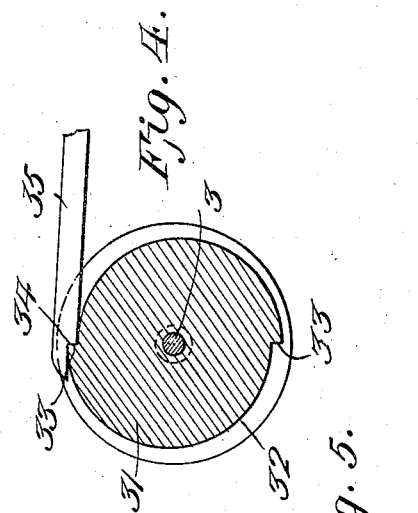
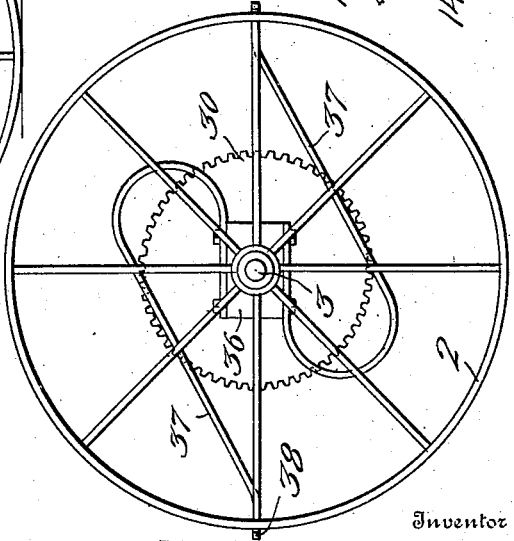
Inventor
Henry F. Blair
Witnesses
Frank B. Hoffman
By Victor J. Evans
Attorney

UNITED STATES PATENT OFFICE.

HENRY F. BLAIR, OF HERMITAGE, MISSOURI.

CORN-PLANTER.

No. 842,755. Specification of Letters Patent. Patented Jan. 29, 1907.

Application filed November 3, 1906. Serial No. 341,929.

*To all whom it may concern:*

Be it known that I, HENRY F. BLAIR, a citizen of the United States, residing at Hermitage, in the county of Hickory and State of Missouri, have invented new and useful Improvements in Corn-Planters, of which the following is a specification.

This invention relates to corn-planters, being directed especially to the planting mechanism, and has for its objects to provide a comparatively simple inexpensive device of this character wherein the dropping devices will be positively actuated at determined intervals, one wherein a uniformity in the spacing between the hills will be preserved, one in which the ground-surface will be properly and effectually marked to indicate the positions of the hills, and one wherein the markers may be readily and conveniently set at the beginning of the rows to accord with the previously-planted rows.

With these and other objects in view the invention comprises the novel features of construction and combination of parts more fully hereinafter described.

In the accompanying drawings, Figure 1 is a top plan view of a planter embodying the invention. Fig. 2 is a vertical longitudinal section taken on the line 2 2 of Fig. 1. Fig. 3 is a detail side elevation of one of the transporting-wheels. Fig. 4 is a detail view, partly in section, of one of the plunger-bars and its operating-cam. Fig. 5 is a detail view, partly in section, of one of the winding-drums.

Referring to the drawings, it will be seen that the machine embodies a main frame 1, preferably of open rectangular form, as shown, and sustained for travel on transporting-wheels 2, fixed upon the ends of a rotary shaft or axle 3, journaled in suitable bearings fixed on the side bars of the frame, at the rear end of which there is mounted a seat 4, there being journaled at the forward end of the frame a dropper or operating-shaft 5, connected with and for operating suitable dropping devices within the seedboxes 6, while arranged in rear of and parallel with the dropper-shaft is a rock-shaft 7, journaled in suitable bearings 8 and provided adjacent its ends with crank portions or bends 9.

Fixed upon the ends of the rock-shaft 7 are pulleys 10, to each of which there is fixed one end of a flexible connecting strap or band 11, having its other end attached to a drum 12, mounted idly on the shaft 5 and carrying on one of its side walls gravity-operated pawls 13, adapted for engagement with a toothed ratchet 14, fixed on the dropper-shaft for rotating the same in one direction, the drum on which the belt 11 is wound reversely to the direction of winding of the pulley 10 being adapted for rotation against the action of strap 11 and for rewinding the same under the influence of a spiral spring 15, housed within the drum and terminally attached to the latter and to the shaft. It will be observed that in this connection that when the shaft 7 is rotated in the manner hereinafter explained the straps 11 will be wound on the pulleys 10 and will in unwinding from the drums 12 rotate the latter for imparting a corresponding rotation to the shaft 5 through engagement of the pawls 13 with the ratchets 14, the springs acting, as will be understood, to rewind the straps upon the drums 12, which may in this operation obviously move independently of the shaft 5.

Arranged loosely on the drive-shaft 3 at a point adjacent its longitudinal center is a gear 16, having its hub provided with a toothed clutch-head 17, adapted for engagement by a correspondingly-toothed clutch member or head 18, fixed for rotation with and for longitudinal movement on the shaft and normally pressed into engagement with the head 17 by means of an expanded spring 19, coiled upon the shaft, on which there is fixed a collar 20 for holding the gear 16 against movement under the action of the spring 19, while attached to the frame 1 at a point in advance of the shaft 3 is a toothed segmental rack 21, having pivoted thereto a lever 22, provided with a downwardly and rearwardly extended arm 23, terminating at its rear end in a wedge-shaped head 2, adapted for entrance between the clutch members 17 18 to move them out of engagement one with the other. The arm 23 is connected at a point between its ends to one of the frame-bars by means of a link 25, having its ends pivoted, respectively, to said parts and serving to support the weight of the lever, but at the same time permit free movement thereof to and from clutch-operating position, the lever being locked against movement through the medium of a pawl 26 of ordinary form, which engages the rack 21.

Extended transversely of the frame and journaled for rotation therein at a point in rear of and parallel with the shaft 3 is a second shaft 27, having fixed thereon a pinion 28 in mesh with the gear 16, and a pair of pinions 29 in mesh with gears 20, mounted loosely for rotation on the shaft 3 at the inner faces of the wheels 2 and in turn having attached to their inner faces cam-heads 31, provided with peripheral cam-grooves 32, in each of which there is formed a pair of opposed engaging portions or shoulders 33, adapted for engagement with corresponding shoulders 34, formed at the rear ends of plunger-bars 35, the forward ends of which are pivoted in the crank portions 9 of the shaft 7 for rocking the latter upon forward movement of the plunger-bars under the action of the cam-heads 31, while fixed at the outer faces of the gears 30 are bearing-blocks 36, to each of which there is attached a pair of spring marker-arms 37, terminating at their outer ends in ground-engaging portions or fingers 38, which extend across the tread of the adjacent wheel 2 and at diametrically opposite points.

Loosely pivoted on the shaft 27 is a setting-lever 39, having a pawl 40, adapted for engagement with a circular rack 41, in turn fixed upon the shaft and coöperating with the pawl 40 to lock the lever 39 for rotating the shaft, the lever being within convenient reach from the operator's seat 4.

In practice as the machine advances over the ground and supposing the clutch 18 to be in engagement with the clutch 17 the shaft or axle 3 will be rotated by the ground-wheels 2 and the gear 16 act through engagement with pinion 28 for rotating shaft 27, which in turn will through engagement of the pinions 29 with the gears 30 operate the cam-heads 31 and also the markers 37. During rotation of the cam-heads 31 the plunger-bars 35 will at determined intervals and through engagement of the shoulders 33 with the shoulders 34 be moved forwardly, thereby rocking the shaft 7 for winding the belts 11 on the pulleys 10 and rotating the dropper-shaft 5 for operating the dropper-plates within the boxes 6. After each forward movement of the plunger-bars 35 and upon the shoulders 33 releasing the shoulders 34 the drums 12 will under the influence of springs 15 rewind the belts 11 and through the reverse rotation thus imparted to the shaft 7 return the plungers to normal position for actuation by the next succeeding shoulder 33. Also during rotation of the gears 30 the markers will be operated for causing their portions or necks 38 to mark the ground-surface at appropriate intervals for the hills, it being noted that the parts of the mechanism may be thrown out of operation at will and as circumstances may require by lifting the lever 22 to cause the head 24 to enter between and throw the clutch member 18 out of engagement with clutch 17, and, further, that at the beginning of a row the markers may be properly set for throwing the clutches out of engagement and operating the shaft 27 through the medium of lever 39 and rack 41 to turn the gears 30 through the medium of the pinions 29 and properly set the markers in accord with the completed rows.

Having thus described my invention, what I claim is—

1. In a planter, a main frame, a drive-shaft journaled therein and provided with transporting-wheels, a dropper-shaft having winding-drums thereon, means for fixing the drums for rotation in one direction with the shaft, a rock-shaft provided with winding-pulleys, belts normally wound on the drums and connected to be wound on the pulleys, and means actuated by the drive-shaft for actuating the rock-shaft.

2. In a planter, a main frame, a drive-shaft journaled therein and equipped with transporting-wheels, a dropper-shaft, winding-drums on said shaft, means for fixing the drums to the shaft for rotating the latter in one direction, a rock-shaft having winding-pulleys, belts normally wound in one direction on the drums and connected to be reversely wound on the pulleys, plunger-bars for actuating the rock-shaft, cam-heads on the drive-shaft for operating the plunger-bars, and springs arranged to act on the winding-drums for winding the belts thereon.

3. In a planter, a main frame, a drive-shaft journaled therein and equipped with transporting-wheels, a second shaft having geared connection with the drive-shaft, gears idly mounted on the drive-shaft and carrying cam-heads, pinions fixed on the second shaft in engagement with the gears for rotating said cam-heads, a dropper-shaft, means including plungers operated by the cam-heads for rotating the dropper-shaft, and means for throwing said shaft out of gear with the drive-shaft at will.

In testimony whereof I affix my signature in presence of two witnesses.

HENRY F. BLAIR.

Witnesses:
J. W. MONTGOMERY,
P. E. COON.